United States Patent [19]
Rundle et al.

[11] Patent Number: 5,584,215
[45] Date of Patent: Dec. 17, 1996

[54] TIRE CUTTING APPARATUS

[76] Inventors: Christopher Rundle, 12598 SW. 60th Ct., Miami, Fla. 33156; Michael Borell, 7787 SW. 86th St., Apt. 310, Miami, Fla. 33143

[21] Appl. No.: 402,043

[22] Filed: Mar. 10, 1995

[51] Int. Cl.$^6$ ............................................. B26D 1/46
[52] U.S. Cl. .................... 82/101; 83/813; 83/871; 83/951; 82/104
[58] Field of Search ................ 82/53.1, 78, 95, 82/101, 104; 83/788, 923, 951, 614, 871, 809, 813, 794, 451

[56] References Cited

U.S. PATENT DOCUMENTS

| | | | |
|---|---|---|---|
| 3,813,974 | 6/1974 | Friberg et al. | 83/951 X |
| 3,830,120 | 8/1974 | Peterson . | |
| 3,919,904 | 11/1975 | Kuts | 82/101 X |
| 3,922,942 | 12/1975 | Fawcett et al. | 83/923 X |
| 4,012,973 | 3/1977 | Tupper . | |
| 4,072,072 | 2/1978 | Harb | 82/101 X |
| 4,096,772 | 6/1978 | Hall . | |
| 4,338,839 | 7/1982 | Farrell, Sr. et al. | 83/923 X |
| 4,338,840 | 7/1982 | Farrell, Sr. et al. | 83/923 X |
| 4,355,556 | 10/1982 | Ulsky | 83/923 X |
| 4,405,090 | 9/1983 | Wakeem | 83/923 X |
| 4,450,738 | 5/1984 | Tupper . | |
| 4,805,507 | 2/1989 | Schmidt et al. | 83/923 X |
| 4,976,178 | 12/1990 | Barclay | 83/951 X |
| 5,054,351 | 10/1991 | Jolliffe . | |
| 5,133,236 | 7/1992 | Dudley | 83/951 X |
| 5,199,337 | 4/1993 | Parker | 82/101 X |
| 5,235,888 | 8/1993 | Dom | 83/923 X |
| 5,257,561 | 11/1993 | Folta | 82/104 X |
| 5,267,496 | 12/1993 | Roach . | |
| 5,285,707 | 2/1994 | Lodovico et al. | 83/951 X |
| 5,321,931 | 6/1994 | Bluteau . | |

Primary Examiner—Rinaldi I. Rada
Assistant Examiner—Elizabeth Stanley
Attorney, Agent, or Firm—McHale & Slavin, P.A.

[57] ABSTRACT

The instant invention is a tire cutting apparatus which operates in conjunction with a conventional band saw providing a used tire treatment mechanism that is affordable to purchase and maintain. A tire support assembly having flexible bands to expand to the inner perimeter of a tire casing is used with tire rotational speed controlled by a motor which frictionally engages an outer perimeter of the tire. The tire casing is further stabilized during the cutting operation by a wheel platform which supports a conventional band saw. The tire casing is rotated during or by band saw operation cutting the tire casing in two equal halves with smooth edges. The apparatus further includes an enclosure providing a catch basin for material cut from the tire and a cover allowing the apparatus to be stored or used as a work table. Wheels allow the enclosure to be easily moved and stood upright in a corner should space be a problem.

15 Claims, 3 Drawing Sheets

TIRE CUTTING APPARATUS

FIELD OF THE INVENTION

This invention relates to the disposal of used tires and more particularly to an apparatus for cutting used tires in half allowing for the uniform stacking thereof.

BACKGROUND OF THE INVENTION

One of the most important components on a truck or automobile is the tire. The tire provides the only contact with the road and is thus essential for stopping and turning, making proper maintenance of the tire a necessity for the safety of the vehicle occupants. In an effort to enhance the quality of tires, manufacturers have perfected rubber compounds that are resistant to degradation. The use of metal or fiberglass belts in addition to degradation resistant rubber combine to make disposal of worn out tires a serious problem.

In the United States alone nearly three hundred million automobile and truck tires are discarded each year. Previously the tires were placed in landfills where they consumed valuable space, as the tire creates a volume of non-fillable space that approximates the size of the tire as the space is within the sidewalls of the tire. To lessen the burden on landfills, used tires are now separated from regular waste materials and placed into their own landfill or recycled. Tire landfills have created new problems such as providing huge areas of unsightly waste that are both fire and health hazards. Rubber tire compounds are nearly impossible to extinguish once ignited producing noxious sulfur dioxide gas during combustion. Once a tire fire occurs the ground and water table surrounding the dump may be contaminated for decades. Further, the trappage of water within the tires produces countless bodies of water ideal for breeding mosquitoes. While various recycling processes are well developed, in many instances the cost is prohibitively high leaving landfills as the most viable alternative for disposal of waste tires.

One of the problems with the tire disposal, to which this invention addresses, is that the majority of tire treating devices are directed to equipment located at the landfill. The tire replacer, whether it be a local gas station or a tire specialty shop, has a storage problem like a landfill albeit on a smaller scale. For example, a local gas station that refits ten cars will have forty tires that must be stored until a transport truck picks them up. Storing the tires outside subjects the tire to rain wherein water can be trapped inside the tire casing. This standing water provides a breeding ground for bugs and increases the weight of the tire. The transport truck must also attempt to store as many tires as possible to keep transportation costs to a minimum. Tire volume affects the transportation as the vehicle is limited in capacity even if the tires are stacked neatly. Should the tires be filled with water it will make stacking difficult. Thus, the used tire presents a disposal problem by the mere size of the tire casing and the inability to stack a plurality of tires.

Used tires are known to make excellent artificial reefs. In such instances the tires must be filled with cement to prevent air trappage causing flotation of the tire. For this reason, it has been recognized that a tire cut in half eliminates the ability for the tire to trap air beneath water or hold a volume of water when stored above ground. A split tire further allows for the stackability of tire halves by placement of one inside another. Splitting of a tire in half may eliminate standing water, stacking problems, and flotation problems when used as a reef, improper splitting may cause additional problems. In particular, improper splitting may lead to exposed wires from metal belts that can cut a person who attempts to move the tires or fish that come in contact with the exposed belts. While a number of prior art patents set forth devices that can split a tire casing in half, none of the prior art teaches an affordable tire splitter that addresses the need to make a smooth cut.

U.S. Pat. No. 3,830,120 sets forth a device for cutting a tire in half. The device utilizes a mandrel which engages the inner portion of the tire and is pressed against the biasing wheels so as to cut the tire into two halves.

U.S. Pat. No. 4,012,973 discloses another cutting device which also cuts the tire casing from the inside out. The use of a knife blade limits the device to materials that can be cut with a knife as a steel reinforced belted tire will resist cutting and quickly lead to blade replacement.

U.S. Pat. No. 4,450,738 discloses a tire splitting apparatus which is claimed as an improvement to the previous patent by teaching a mechanism for improving tire support so as to allow repeated revolutions as necessary in order to complete the tire splitting process. The tire is held in a guide clamp providing for the true rotation of the tire using a pressure roll head with a knife mounted thereon inserted through the crown of the tire which performs the cutting from the inside of the tire outwardly.

U.S. Pat. No. 5,321,321 discloses a method and apparatus for cutting tires in half for the purpose of stacking and storage. The apparatus is an elaborate mechanism that slices a tire in half and performs radial incisions in each half which extend through the threaded portion and part of the sidewall. Each half is then stacked on top of each other in order to form a pile of half tires before the pile is compressed in order to flatten each half tire.

U.S. Pat. No. 5,054,351 discloses a cutting mechanism which is inserted through the inner opening of the tire and pressed against a backing support adapted to split the tire into two separate halves.

U.S. Pat. No. 4,096,772 discloses another tire splitting mechanism that inserts through the inner opening of the tire and presses the tire against a cutting mechanism such as a flat knife so as to slit the tire into portions that can be easily stacked.

U.S. Pat. No. 5,267,496 discloses yet another tire cutting device disclosing the use of a shredder for cutting the tire into pieces by a series of predefined cuts.

Thus, what is needed in the art is a low cost portable tire cutter for point-of-use placement that operates with a conventional band saw that will not foul like a knife blade.

SUMMARY OF THE INVENTION

The instant invention is a portable point-of-use tire cutting apparatus having an enclosure with transfer wheels. The device utilizes a conventional band saw providing a commercially available product for reliability and reducing replacement costs typically associated with prior art device using specialty knives. A tire is held in position by the use of outwardly expanding bands that engage the inner opening of the tire. The bands are operatively associated with a threaded rod having one end of the rod secured to an adjustable support post. A free end of the rod is available for the slidable movement of an engagement nut which operates to expand the bands outwardly when the engagement nut is moved toward the first end of the rod as attached to the support post, thus expanding the bands outwardly to engage the inner opening of the tire. The bands allow adjustment to any size tire opening by movement of the engagement nut to a position so that the bands are forced against the inner edge of the tire opening.

The rod is secured to the support post with wheel bearings in a cantilever manner allowing the rod to be rotated freely. A handle secured to one end of the rod allows the rod to be rotated manually. A latch is available to hold the rod support in position with the bands fixed to an engagement nut causing the rotation of the rod to move the engagement nut either inwardly or outwardly according to the directional rotation of the handle. A tire placed over the rod is secured by adjusting the bands against the inner diameter of the tire casing. Once the tire has been secured in position, the rod support is unlatched allowing the assembly to rotate freely.

The rod support post is lowered into position once a tire is secured to the bands for engagement with an outer tire casing alignment mechanism. The rod support housing is lowered manually with the weight of the casing facilitating the movement and is locked into position by a latch lock. An electric motor with a roller attached to the drive shaft rotates the tire while a band saw is used to cut through the tire. The alignment mechanism and band saw are biased in an upward position so as to allow for a uniform and clean cut. By use of a conventional band saw the consumer is provided with a low cost cutting mechanism based upon a proven technology that is commercially available.

The instant invention includes a cabinet to catch tire debris and to conceal all operating mechanisms when not in use. The adjustable post lowers to a compact position as does the alignment mechanism and band saw. The cover may be used as a work table when not in use. In addition, a pair of wheels are provided on one end of the enclosure with handles on an opposite end allowing the enclosure to be moved like a dolly further providing for upright storage.

Thus, an objective of the instant invention is to provide a point-of-use tire cutter that is economical and requires a minimal amount of space for storage and operation thereof. The treatment of used tires at the point of disposal provides alternatives to help alleviate storage, transportation and landfill problems. For instance, in Dade County Florida proper treatment of tires allows for use of the tires in the creation of artificial reefs.

Another objective of the instant invention is to teach the use of a conventional band saw for use in cutting of a tire providing the consumer with a cutting mechanism of proven technology thereby eliminating the need for specialty knives which can be dulled by the various tire technologies that include steel belting.

Another objective of the instant invention is to teach the use of a cutting tool that will cut a tire casing smoothly eliminating the injury causing sharp edges that accompany prior art tire splitters.

Still another objective of the instant invention is to provide a tire cutting mechanism having an enclosure to protect the device when not in use wherein the enclosure may be used as a work platform.

Yet still another objective of the instant invention is to provide a tire cutting mechanism that can be easily moved by use of wheels located on one end of the device and handles at the opposite end.

Yet still another objective of the instant invention is to teach the use of flexible bands for securement of a tire wherein the bands will conform to the inner-diameter of a tire casing by movement of an engagement nut along a threaded rod so as to expand or contract spacer bands in accordance with the inner-diameter of the tire casing.

Other objectives and advantages of this invention will become apparent from the following description taken in conjunction with the accompanying drawings wherein are set forth by way of illustration and example, certain embodiments of this invention. The drawings constitute a part of the specification and include exemplary embodiments of the present invention and illustrate various objects and features thereof.

DETAILED DESCRIPTION OF THE PREFERRED EMBODIMENT

Figure 1:
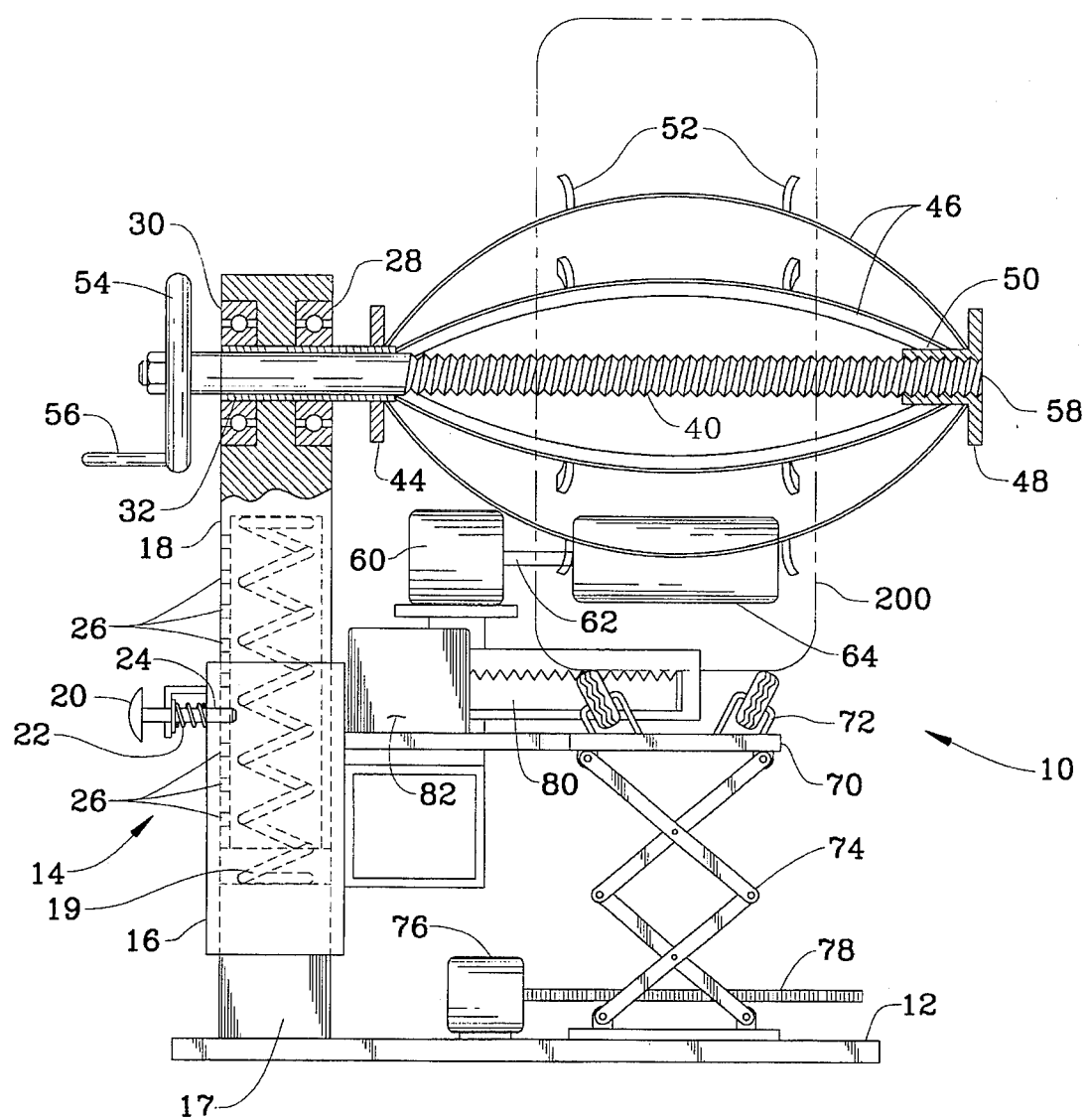
FIG. 1 is a side elevation of the apparatus according to the instant invention illustrating a tire casing being depicted in phantom outline.

Now referring to FIG. 1 of the instant invention 10 having a platform support structure 12 providing a base for a tire support assembly 14 mounted to the structure by lower support housing 16 which is slidably insertable over alignment boss 17. The lower support post 16 is a tube allowing for the slidable insertion of an upper support post 18 having a height secured manually upon positioning by locking in position with latch handle 20 using spring 22 which biases insertion pin 24 into position for engagement into one of the adjoining apertures 26. Spring 19 assists in the raising or lowering of the upper support post 18. The relationship of the upper support post 18 to the lower support post 16 is dependent upon the size of tire to be cut. As described in detail later in this specification, once a tire has been secured to the assembly, upper support post 18 is lowered into position by gravity with a position held in place by latch handle 20. The spring 19 provides a biasing means in relation to the alignment boss 17 to support one side of a cutting platform providing for controlled contact of a tire casing with a cutting saw blade.

The upper support post 18 has a bearing surface provided by inner bearing 28 and outer bearing 30 for rod support housing 32 allowing for free rotation of the housing. The rod support housing 32 employs a support bracket 44 for securement of a plurality of flexible bands 46 at one end which is operatively associated with an engagement nut 48 secured to the rod 40 by matching internal threads 50 allowing the movement of the engagement nut 48 along the threaded length of the rod 40. By securement of engagement nut 48 to the opposite end of the flexible bands 46, movement of the engagement nut 48 toward the support bracket 44 results in the expansion of the flexible bands 46 forcing conformance to the inner perimeter edge of the tire 200. The flexible bands 46 include tabs 52 which align the tire 200 while the engagement nut 48 is drawn closer to the support bracket 44. It should be noted that the use of the flexible bands allows the positioning of a tire in a predetermined position as the bands expand outwardly. Larger diameter tires will be engaged by a more pronounced curvature of the flexible bands. Smaller or wider tires are engaged by the width of the flexible bands. The rod support housing 32 can be locked in a fixed position for installment of a tire casing by use of a locking mechanism, not shown, which engages a portion of the housing to prevent the housing from rotating in relation to the bearings 28, 30. Turning of wheel 54 in a clockwise or counter-clockwise rotation allows for movement of the bands when the rod support housing 32 is stopped or slowed from spinning in relation to the rod 40. Preferably, the tire casing is manually held in position during the rotational securement of the rod 40 for expanding of the bands 46.

In one embodiment an electric drive motor 60 having a drive shaft 62 coupled to an engagement roller 64 frictionally engages the outer circumference of the tire for rotation during the cutting operation. The rotation may be in the same direction as a cutting blade so as to lower the effective rpm's of a cutting blade. Alternatively, when a saw blade having a low rpm is employed the rotation may be reversed all of which provides for a controlled speed across a cutting blade so as to allow proper cutting without heat build up allowing for blade longevity and smooth cutting surfaces. In another embodiment the drive means may include the engagement roller 64 coupled to drag motor to control the spin of the tire as it is drawn across a moving cutting blade. In this use the drag motor, not shown, prevents the tire casing from spinning at the same rpm as the blade is moving allowing for a cutting action.

A tire casing stabilizer is provided by use of tire stabilizer support platform 70 having a rectangular shape with raised outwardly facing stabilizer wheels 72 positioned at each corner of the platform for engagement of the outer perimeter edge of the tire 200. The stabilizer wheels 72 maintain the outer edge of the tire 200 in position while the cutting blade 80 of the band saw 82 disposed between the wheels provides for the cutting of the tire as the tire is rotated. The tire stabilizer support platform 70 is mounted to the lower support housing 16 along one end support by scissors jack 74 moveable by electric jack motor 76 having a threaded rod 78. The tire stabilizer support platform 70 is raised when the electric jack motor 76 is operated further allowing the lower support post 16 to be raised for engagement of the tire. The tire stabilizer portion and tire support rod assembly operate in conjunction to allow the device to be used with various sized tires and allowing a frictional engagement with the tire casing.

In operation, the tire stabilizer support platform 70 is lowered allowing a tire 200 to be placed over the free end 58 of the rod 40 for securement by the flexible bands 46 which is assisted by tabs 52 engaging the inner surface of the tire 200. In situations where oversized tires are used the upper support post 18 is raised by releasing of the latch handle 20 allowing the spring 19 to assist in moving the housing upward. The rod support housing 32 is secured in position by a locking handle if available or the tire casing is held manually to prevent excess rotation while the hand crank 56 of the wheel 54 is rotated. The flexible bands are expanded by rotation of wheel 54 in relation to the rod 40 by causing the engagement nut 48 to move toward support bracket 44 to engage the flexible bands 46 with the inner edge of the tire 200. Once the tire 200 is securely mounted to the flexible bands, the tire 200 and rod 40 are allowed to rotate freely around bearings 30 and 28. The upper support post 18 is then lowered into the lower support housing 16 by pulling latch handle 20 wherein the upper support post 18 slides into the lower support post 16 until the tire 200 engages the stabilizer wheels 72 mounted on top the tire stabilizer platform 70. The spring 19 then operates to bias the tire against the stabilizer wheels 72. Upon an initial setting the latch handle 20 is released allowing insertion pin 24 to be inserted into an adjoining aperture 26. The electric jack motor 76 can then be engaged to adjust the biasing force of stabilizer wheels 72 and band saw 82 against the outer casing of the tire 200 providing both stabilization of the tire casing and proper positioning of band saw 82 along the center portion of the tire treads.

Band saw 82 is then operated as electric drive motor 60 controls rotational speed of the tire through engagement roller 64 allowing the cutting blade 80 to cut through the tire during rotation of the tire. If necessary, the tire stabilizer support platform 70 may be raised in height during the rotation providing pressure on cutting blade 80 to cut the tire into equal halves although the spring 19 typically provides sufficient engagement force. The band saw 82 operates to cut the tire at a speed allowing for the cutting process to provide smooth edges. This results in a clean cut of the bands so as to prevent sharp edges that may otherwise lead to injury.

Once the tire is cut into halves, wheel 54 may be rotated causing the engagement nut 48 to move away from the support bracket 44 resulting in the flexible bands 46 to be flattened allowing removal of the tire 200, now cut into two equal halves. With the tire split into halves, the tires can be stacked inside each other. The cut tires will not accumulate standing water or trap air. Thus, the device allows point of use tire cutting to reduce storage and shipping demands. This further reduces the impact on a landfill by lessening the space requirements and eliminating the standing pools of water. In addition, alternative uses such as offshore reefs may be an affordable option as the country need only transport the waste tires with no further need of treatment.

Upon storage the device, the electric jack motor 76 may lower the tire stabilizer support platform 70 to a position juxtaposed to platform support structure 12. Similarly, the upper support post 18 may be inserted into the lower support housing 16 by unlocking latch handle 20 allowing full insertion of the upper support post 18. As shown in later figures, the device is now sufficiently compact to be enclosed by side walls allowing for concealment and storage of the device.

Figure 2:
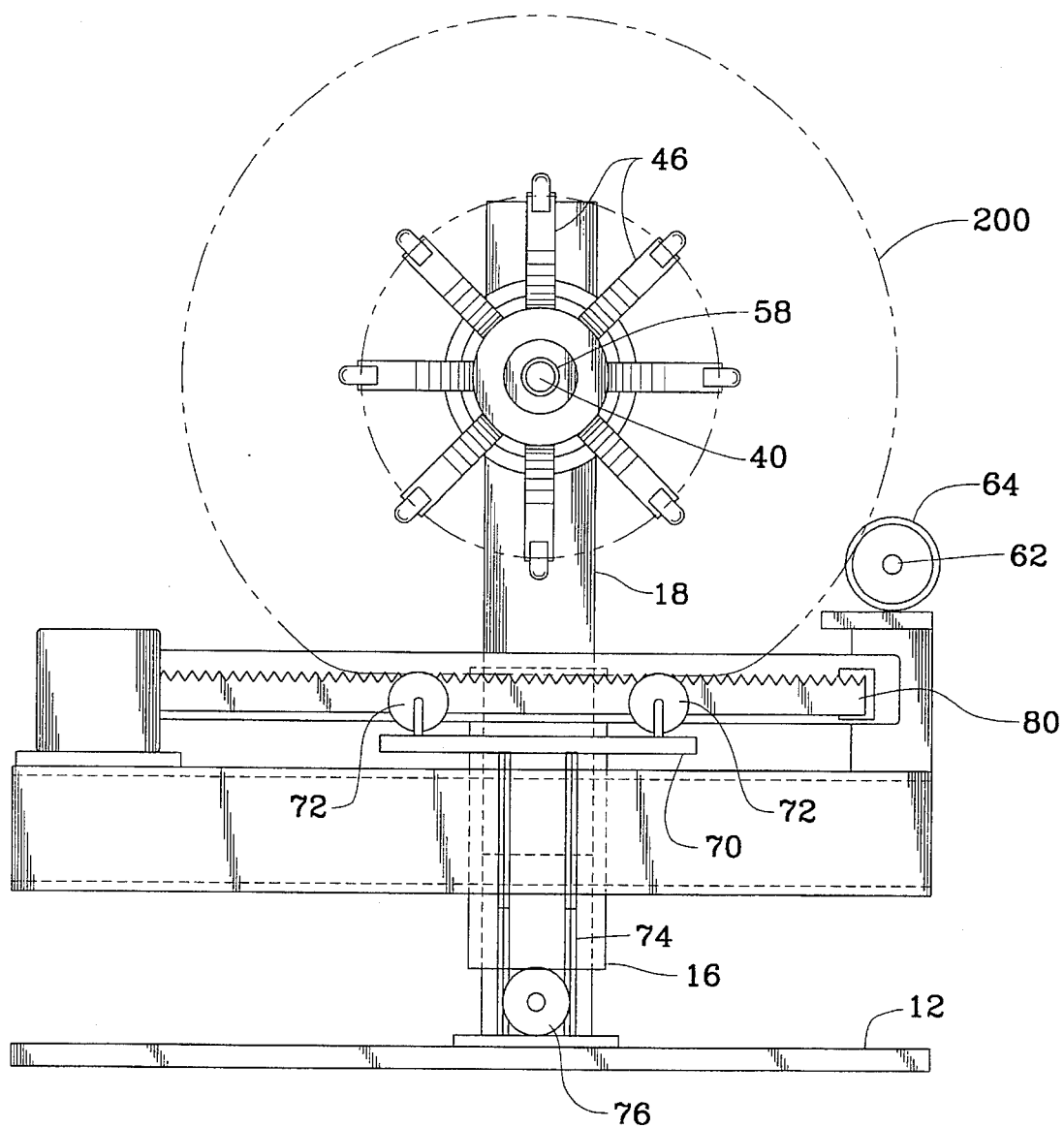
FIG. 2 is an end elevation view of FIG. 1.

Now referring to FIG. 2 shown is a side view of FIG. 1 having free end 58 providing a rotational axis for tire 200 which is secured to the rod 40 by the plurality of flexible bands 46. When positioned, the tire 200 is rotated by use of the engagement roller 64 mounted on the end of the drive means defined as a electric drive motor 60 and drive shaft 62 for engagement across cutting blade 80 which is rotated respective to the tire 200. As shown by way of illustration the tire stabilizer support platform 70 biases the stabilizer wheels 72 against the outer perimeter of the tire 200. The lower support post 16 is shown in relation to upper support post 18 allowing for the movement of free end 58. The tire stabilizer support platform 70 is positioned by scissors jack 74 which is moved by the electric jack motor 76 in an upward & downward direction for operation of the device, the downward position provides for compact storage thereof.

The tire 200 is placed upon the flexible bands 46 for engagement to the inner rim of the tire thereby securing the tire for proper rotation around rod 40. The rod 40, shown by an end view, is maintained on a horizontal plane and lowered to the tire stabilizer support platform 70 for biasing against the stabilizer wheels 72. A pictorial of the tire 200 illustrates the deflection of a lower portion of the tire 200 providing a flattened surface allowing cutting blade 80 to engage the tire for proper cutting thereof. The tire 200 is controlled in rotation by electric drive motor 60 with engagement roller 64 while cutting blade 80 is rotated in the same or opposite direction. Positioning of the saw blade is performed by lowering of the tire as coupled to the band to the stabilizer wheel 72 with biasing provided by electric jack motor 76 through scissors jack 74 so as to raise free end 58 holding the cutting blade 80.

Figure 3:
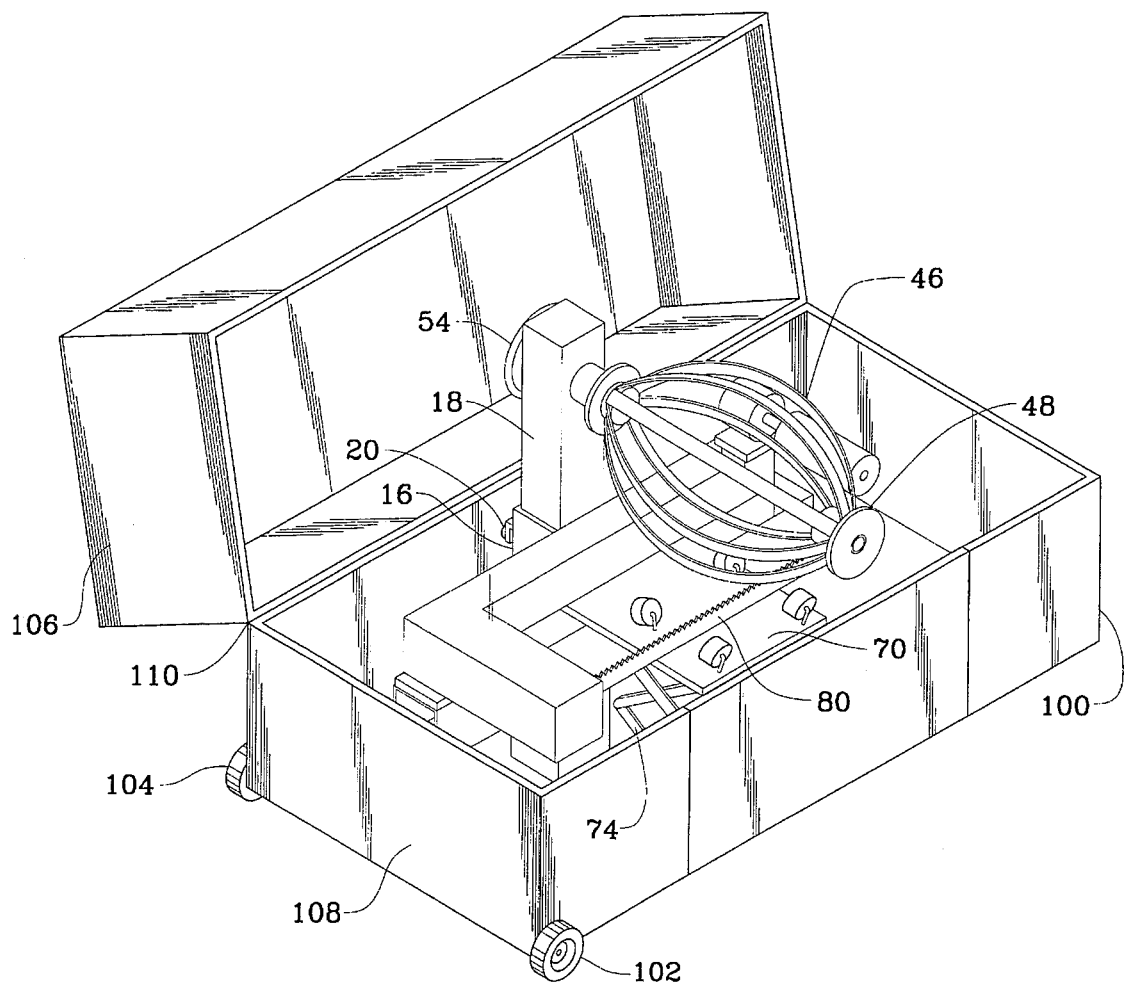
FIG. 3 is a perspective view of the apparatus placed within a storage container.

Now referring to FIG. 3, shown is a perspective view of the instant invention placed within a housing 100. Housing 100 comprises a lower containment section for use as a catch basin for holding material cut from a tire casing, and an upper containment section for use as a cover. The lower containment section includes a pair of wheels 102, 104 placed along one end 108 of housing 100. The upper containment section is a removable cover 106 for placement over the top of the apparatus. Housing 100 may be used as a work table or stored on end 108 in an upright position to minimize storage space. The cover 106 is removable or may be hinged along point 110 against a back wall. It is noted that the cover 106 shown is for illustration purposes only. The cover may include split openings allowing the cover to lay flat against the side walls or folded flat and stored separately. This includes the use of multiple openings allowing the cover to be opened in sections providing shields for catching of material cut from the tires and minimizing floor space. An access door allows for ease of cleaning debris that accumulates during the cutting process. In this embodiment the upper support post 18 is lowered into the lower support post 16 by pulling of latch handle 20 allowing the slidable insertion into the lower support post 16. The cutting blade 80 is lowered in conjunction with the tire stabilizer support platform 70 by the rotation of scissors jack 74 into a collapsed position. Flexible bands 46 are adjusted by wheel 54 so as to fit within housing 100 by movement of engagement nut 48 within the side wall of housing 100 allowing for the closure of the cover 106.

Figure 4:
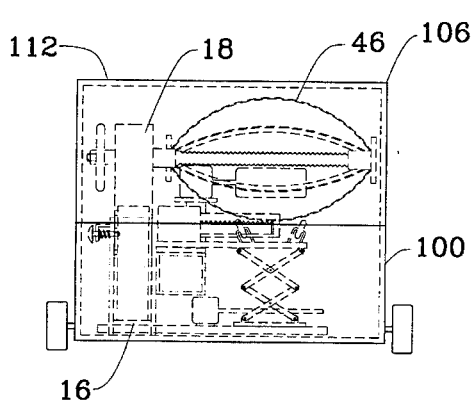
FIG. 4 is an end elevational view of the apparatus stored within the storage container.
Figure 5:
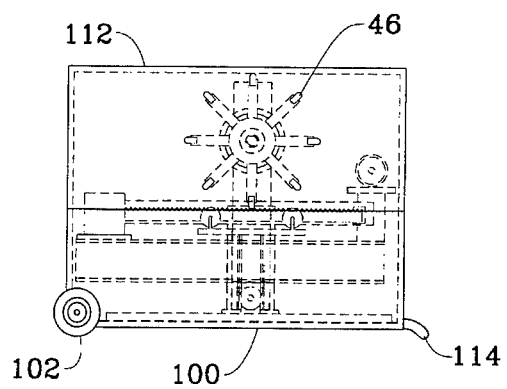
FIG. 5 is a side view of the FIG. 4.

Now referring to FIG. 4, housing 100 is shown with cover 106 in a closed position encompassing the flexible bands 46 and support posts 16, 18 in a closed position with top surface 112 available as a working platform providing utility to housing when the tire cutting device is not in operation. As shown in FIG. 5 a side view of FIG. 4 depicts placement of the flexible bands 46 in a closed position with wheels 102 and a handle 114 allowing the enclosure 100 to be moved in a wheel cart type manner.

It is to be understood that while we have illustrated and described certain forms of our invention, it is not to be limited to the specific forms or arrangement of parts herein described and shown. It will be readily apparent to those skilled in the art that various changes may be made without departing from the scope of the invention and the invention is not to be considered limited to what is shown in the drawings and described in the specification.

What is claimed is:

1. An apparatus for cutting a tire into two equal halves comprising:

a frame base;

a tire support assembly comprising an adjustable support post coupled to said frame base, said support post having a threaded rod rotatably coupled thereto with an engagement nut movable along a length of said threaded rod;

a plurality of flexible bands each having a first end rotatably coupled to said support post and a second end coupled to said engagement nut;

means for securing the rotational movement of said threaded rod permitting manual rotating of said threaded rod for moving said engagement nut along a length of said threaded rod to bias said bands outwardly for engaging an inner perimeter of a tire casing;

tire casing drive means engaging an outer perimeter of the tire casing for rotation control of the tire casing;

tire stabilizer means engaging an outer perimeter of the tire casing for maintaining the tire casing in a rotational axis with respect to said threaded rod;

and a saw blade positioned to cut the tire casing into two halves;

whereby said tire casing is secured to said bands and rotated by said tire casing drive means wherein the tire casing is cut in half as the tire casing is drawn across said saw blade.

2. The tire cutter according to claim 1 wherein said adjustable support post is further defined by a lower support post housing slidably attached to an alignment boss secured to said frame base with an upper support post slidably attached to said lower support post, wherein said upper support post is movable for positioning of said tire casing in relation to said saw blade and is partially inserted into a lower support post for storage.

3. The tire cutter according to claim 2 including a spring means for biasing said upper support post to said alignment boss.

4. The tire cutter according to claim 1 including at least two tabs attached to each said band for engaging an inner edge of a tire casing to assist in positioning of the tire casing on said bands.

5. The tire cutter according to claim 1 wherein said frame base includes a housing, said housing having a lower containment section for use as a catch basin for holding material cut from a tire casing and an upper containment section for use as a cover.

6. The tire cutter according to claim 5 wherein said lower containment section includes a pair of wheels mounted along one end for ease in transportation thereof.

7. The tire cutter according to claim 1 wherein said saw blade is a rotating band saw disposed perpendicular to the rotational axis of said rod for engagement of a tire casing.

8. The tire cutter according to claim 1 wherein said tire casing drive means is further defined as an engagement roller and a drag motor to control the rotational speed of the tire casing.

9. The tire cutter according to claim 1 including a tire stabilizer defined by a rectangular bracket having a plurality of outwardly directed engagement wheels positioned along each corner of said bracket.

10. The tire cutter according to claim 9 wherein said bracket has an upper surface that remains parallel to the ground and is movable along a vertical plane by means of an electric scissor jack maintained in a horizontal plane.

11. An apparatus for cutting a tire into two equal halves comprising:

a frame base;

a tire support assembly comprising an adjustable support post coupled to said frame base, said support post having a threaded rod rotatably coupled thereto with an engagement nut movable along a length of said threaded rod;

a plurality of flexible bands each having a first end coupled to said support post and a second end coupled to said engagement nut, each band having at least two tabs attached for engaging an inner edge of a tire casing to assist in positioning of the tire casing to said threaded rod;

means for securing the rotational movement of said threaded rod permitting manual rotating of said threaded rod for moving said engagement nut along a length of said threaded rod and to bias said bands outwardly for engaging an inner perimeter of a tire casing;

means for locking said support post in a fixed position;

tire casing drive means for maintaining the rotational speed of a tire casing;

tire stabilizer means engaging an outer perimeter of the tire casing for maintaining the tire casing in a rotational axis with respect to said threaded rod;

a band saw positioned to cut the tire casing into two halves; and a housing means having a detachable cover; and a control panel;

whereby said tire casing is secured to said bands and rotated by said tire casing drive means wherein said tire casing is cut in half as the tire casing is drawn across the rotating band saw.

12. The tire cutter according to claim 11 wherein said tire casing drive means is further defined as an engagement roller and a drag motor to control the rotational speed of the tire casing.

13. The tire cutter according to claim 11 including a housing for storage of said tire cutter, said housing having a pair of wheels mounted along one end of said housing providing support to said housing when said housing is tilted onto said wheels during transportation thereof and a handle means mounted along an opposite end of said housing for support thereof.

14. The tire cutter according to claim 11 wherein said means for locking said support post in a fixed position is further defined as a spring biased insertion pin inserted through a portion of support post to lock said support post in a fixed vertical position into a portion of said support post.

15. The tire cutter according to claim 11 wherein said bracket has an upper surface that remains parallel to the ground and is movable along a vertical plane by means of an electric scissor lack maintained in a horizontal plane.

* * * * *